(12) United States Patent
Miri

(10) Patent No.: US 12,438,438 B2
(45) Date of Patent: Oct. 7, 2025

(54) RESISTANCE LEVEL COMMUNICATION PROTOCOL

(71) Applicant: Medtronic Advanced Energy LLC, Minneapolis, MN (US)

(72) Inventor: Mohammad Miri, Longmont, CO (US)

(73) Assignee: Medtronic Advanced Energy LLC, Minneapolis, MN (US)

( * ) Notice: Subject to any disclaimer, the term of this patent is extended or adjusted under 35 U.S.C. 154(b) by 487 days.

(21) Appl. No.: 18/083,287

(22) Filed: Dec. 16, 2022

(65) Prior Publication Data

US 2024/0204645 A1 Jun. 20, 2024

(51) Int. Cl.

| | |
|---|---|
| *A61B 18/12* | (2006.01) |
| *A61B 90/90* | (2016.01) |
| *H02M 1/00* | (2006.01) |
| A61B 18/00 | (2006.01) |
| A61B 90/00 | (2016.01) |
| H02M 7/48 | (2007.01) |

(52) U.S. Cl.
CPC ....... *H02M 1/0074* (2021.05); *A61B 18/1206* (2013.01); *A61B 2018/00172* (2013.01); *A61B 2018/0072* (2013.01); *A61B 2018/00898* (2013.01); *A61B 2018/00928* (2013.01); *A61B 2018/1266* (2013.01); *A61B 2090/0804* (2016.02); *A61B 90/90* (2016.02); *A61B 2560/028* (2013.01); *H02M 7/4807* (2013.01)

(58) Field of Classification Search
CPC .. H02M 1/0074; A61B 18/1206; A61B 90/90; A61B 2018/00172; A61B 2018/0072; A61B 2018/00928
See application file for complete search history.

(56) References Cited

U.S. PATENT DOCUMENTS

| | | |
|---|---|---|
| 6,558,385 B1 | 5/2003 | McClurken et al. |
| 6,702,810 B2 | 3/2004 | McClurken et al. |
| 6,953,461 B2 | 10/2005 | McClurken et al. |
| 7,115,139 B2 | 10/2006 | McClurken et al. |
| 7,311,708 B2 | 12/2007 | McClurken |
| 7,537,595 B2 | 5/2009 | McClurken |
| 7,645,277 B2 | 1/2010 | McClurken et al. |
| 7,811,282 B2 | 10/2010 | McClurken |
| 2012/0265196 A1 | 10/2012 | Turner et al. |
| 2018/0220891 A1* | 8/2018 | Lee ...................... A61B 5/0022 |

(Continued)

OTHER PUBLICATIONS

PCT/IB2023/062670 PCT Search Report and Written Opinion dated Mar. 11, 2024, 12 pages.

*Primary Examiner* — Sean W Collins
(74) *Attorney, Agent, or Firm* — Husch Blackwell LLP

(57) ABSTRACT

An electrosurgical system includes a generator and an electrosurgical device and is configured to establish two-way communication using a resistance level communication protocol. The electrosurgical device includes an electrical connector configured to receive a treatment signal and a continuous signal from the generator, an AC-DC converter configured to convert the continuous signal, a processor configured to receive the converted continuous signal, and a resistor connected to the processor and configured to vary the current of power used by the processor over time. The generator is configured to interpret variances in the current as data and to provide an acknowledgment to the electrosurgical device.

20 Claims, 9 Drawing Sheets

(56) References Cited

U.S. PATENT DOCUMENTS

| | | |
|---|---|---|
| 2019/0021783 A1 | 1/2019 | Asher et al. |
| 2019/0090957 A1* | 3/2019 | De Wijs ............... A61B 8/0841 |
| 2020/0090808 A1 | 3/2020 | Carroll et al. |
| 2021/0315582 A1 | 10/2021 | Shelton, IV et al. |
| 2022/0015811 A1* | 1/2022 | Lopez Camacho .......................... A61B 17/7216 |

* cited by examiner

RESISTANCE LEVEL COMMUNICATION PROTOCOL

FIELD

Embodiments of the present disclosure relate generally to the field of electrosurgical energy delivery, and more particularly to a resistance level communication protocol for communication between an electrosurgical handpiece and an electrosurgical generator.

BACKGROUND

Electrosurgical devices for applying electrical energy to tissue are commonly used in surgical procedures for hemostatic sealing and coagulation of soft tissue and bone at the operative site. Such electrosurgical devices can be used for, but not limited to orthopedic, spine, thoracic, and open abdominal surgery.

An electrosurgical device may comprise a hand piece having a distally mounted end comprising one or more electrodes. The one or more electrodes can be positioned against the tissue such that electrical current is introduced into the tissue. The generated heat can be used to cut, coagulate or induce metabolic processes in the target tissue. An electrosurgical generator generally provides power and electrical energy in the form of radio frequency ("RF") energy to one of two handpiece topologies, the monopolar and the bipolar.

The handpiece can include one or more buttons for energy activation. Generally the internal digital circuit in the electrosurgical generator is isolated from the front end of the generator and consequently the generator uses a low frequency signal with an isolation transformer to detect the button status of the handpiece. Conventional approaches to powering the handpiece often use a specific level of resistance to detect high resistance, indicating the button is released, and low resistance, indicating the button is pressed.

Conventional electrosurgical handpieces used for electrosurgical tissue treatment are not able to establish communication with the electrosurgical generator and accordingly face several challenges. Some challenges that arise include an inability to determine the manufacturer and model of the electrosurgical handpiece as well as the usage time. Understanding device specific information about an electrosurgical handpiece coupled to a generator is beneficial for safety and consistent treatment delivery.

Accordingly, improved systems and methods are desired for enhancing the communication capabilities of electrosurgical device without changing the generator or requiring a second electrical connection to the electrosurgical device.

SUMMARY

The techniques of this disclosure generally relate to an electrosurgical device configured to communicate with an electrosurgical generator using existing button press signal to enact a resistance level communication protocol, so as to increase functionality of the electrosurgical device without requiring any change to wiring of an electrosurgical generator.

In one aspect, the present disclosure provides a system configured to establish two-way communication using a resistance level communication protocol. The system includes a generator and an electrosurgical device. The electrosurgical device comprises an electrical connector configured to receive a treatment signal and a continuous signal from the generator, an AC-DC converter configured to convert the continuous signal to a DC signal, a processor configured to receive the DC signal, and a resistor connected to the processor and configured to vary a current of power used by the processor over time. The generator is configured to interpret variances in the current as data and provide an acknowledgement to the electrosurgical device using frequency shift keying (FSK).

In another aspect, the disclosure provides a method of two-way communication between an electrosurgical device and a generator. The method comprises providing, via the generator, a continuous signal to the electrosurgical device. Then, at the electrosurgical device, converting the continuous signal to a DC signal, powering a processor with the converted signal, varying, using a resistor, the current of power used by the processor over time, and providing the current to the generator. The method further comprises, at the generator, interpreting variances in the altered current as data and sending an acknowledgement to the electrosurgical device using frequency shift keying (FSK).

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Subject matter hereof may be more completely understood in consideration of the following detailed description of various embodiments in connection with the accompanying figures, in which.

Figure 1:
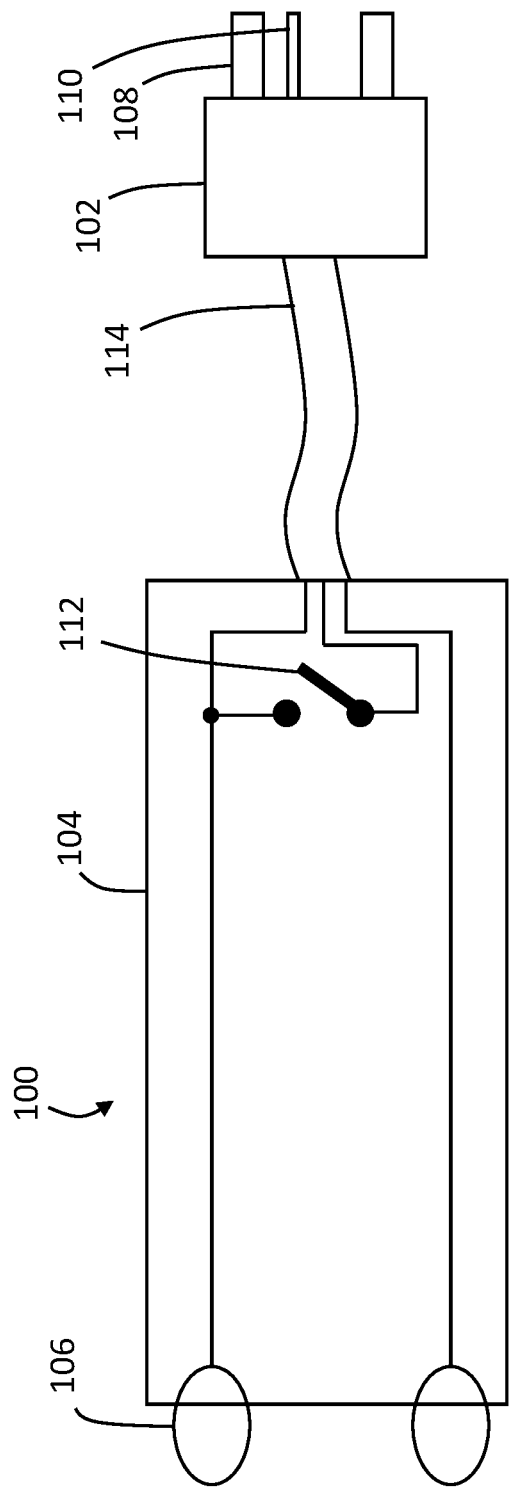
FIG. 1 is a schematic view depicting an electrosurgical device in accordance with the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 is a partial schematic diagram of an electrosurgical device 100 configured to transmit RF energy at a treatment site to provide hemostatic sealing and coagulation of soft tissue and bone. Electrosurgical device 100 includes connector 102 and bipolar handpiece 104 having two electrodes 106.

Connector 102 includes large pins 108 and small pin 110 and is configured to be in electrical communication with an electrosurgical generator (not pictured) and a proximal end of bipolar handpiece 104 such that power signals are delivered to electrodes 106 at a distal end of bipolar handpiece 104. In embodiments, connector 102 can be a 3-pin connector capable of providing a high-power treatment signal and a low-power continuous signal via cable 114. Large pins 108 are for a high-power treatment signal and small pin 110 uses a low-power continuous signal to detect a button press on the handpiece. When the button is pressed, the circuit is closed by switch 112 and the treatment signal is provided. In embodiments, an example of the treatment signal is at 469 KHz and 20 W to 220 W while an example of continuous signal is 47 KHz.

It will be appreciated that the terms "proximal" and "distal" are used herein with reference to a clinician gripping a handpiece. Thus, electrodes 106 are distal with respect to the more proximal handle or gripping portion of bipolar handpiece 104. However, surgical devices are used in many orientations and positions, and these terms are not intended to be limiting and absolute.

Figure 2:
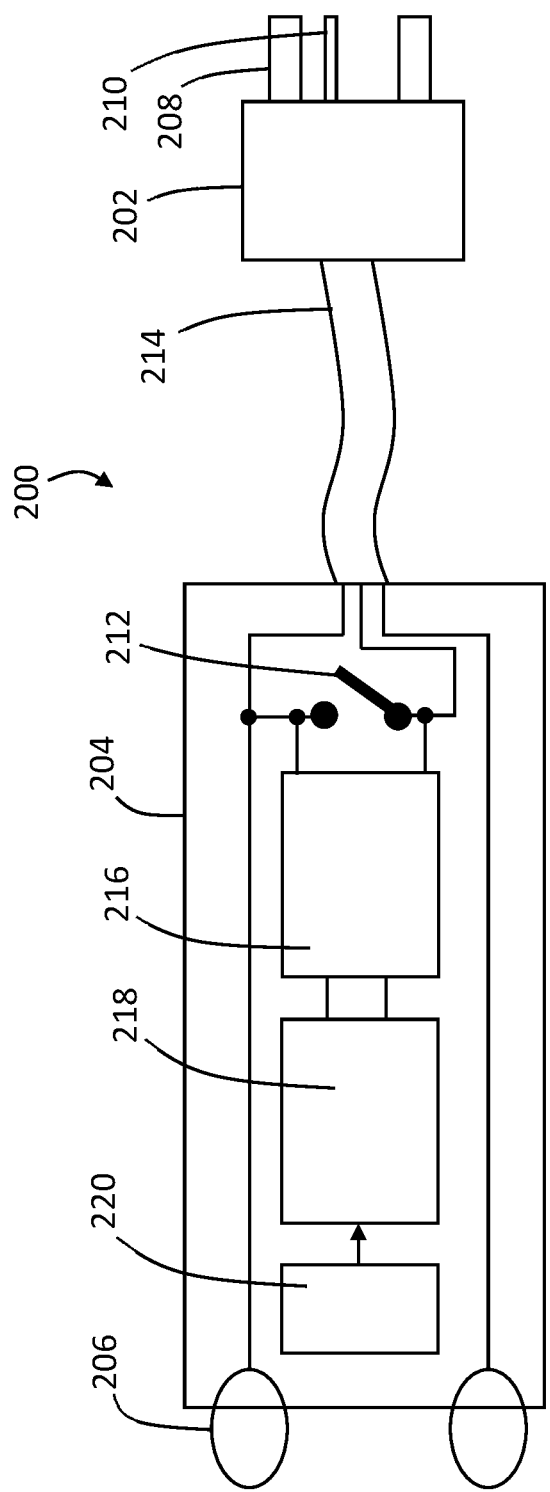
FIG. 2 is a schematic view depicting an electrosurgical device according to an embodiment.

FIG. 2 depicts a schematic diagram of an electrosurgical device 200 configured to use the RF signal used for detecting a button press to communicate device data to an electrosurgical generator. Communicated device data can include one or more of a device ID, accumulated use time for the device, manufacturing information, and waveform information.

Electrosurgical device 200 includes connector 202 and bipolar handpiece 204 having two electrodes 206, switch 212, cord 214, transformer 216, digital potentiometer 218, and controller 220. Connector 202 includes large pins 208 and small pin 210 and is configured to be compatible with existing electrosurgical power source or bipolar energy supplies. For example, the transcollation sealing energy supplied by the Aquamantys® System (available from Medtronic Advanced Energy of Portsmouth, N.H.) may be used. U.S. Pat. Nos. 6,558,385; 6,702,810, 6,953,461; 7,115,139, 7,311,708; 7,537,595; 7,645,277 and 7,811,282 also describe bipolar ablation energy systems suitable for use with embodiments of the present disclosure.

Accordingly, electrosurgical device 200 connects to a source of electrical energy via connector 202. Because connector 202 is designed for compatibility with preexisting generators, the prongs are standardized based on the desired generator. In embodiments, more or less large prongs and short prongs may be used depending on the requirements of the generator. In an embodiment, small pin 210 is used to detect the button activation. Button press detection can occur from monitoring resistance levels from a low power signal produced by the electrosurgical generator. For example, the electrosurgical generator can inject a 47 KHz low power signal between one of the large pins 208 and the small pin 210 and continuously monitor the resistance between these two pins (e.g., every 1 msec). If the resistance is detected to be anything less than a threshold resistance the electrosurgical generator can determine that the button pressed and switch 212 is closed, otherwise the button can be determined to be released and switch 212 is open. In an embodiment the threshold resistance is 400 ohm.

The current reading at the generator is not linear with the resistance threshold. Accordingly, an appropriate resistance threshold should be determined based on the minimum resistance.

In embodiments, the generator can detect the resistance between a first pin connected to one side of a push button and a second pin connected to the other side of the push button. In such embodiments the third pin would be connected to an electrode 206. An analog-to-digital converter (ADC) inside the generator is configured to convert detected resistance to digital counts (e.g. for a 12 bit ADC the conversion would be 0 to 4095 counts). A processor of the generator is then configured to consider any reading equal to or higher than a threshold count as a pressed button and any reading less than the threshold count considered released button. Counts represent the current through the button so a lower resistance results in higher counts. The threshold counts is defined as $R_{min}$. In embodiments, $R_{min}$ can be 1000 count. In such embodiments, each reading between 0 count and 999 count can be considered an open circuit, although the actual number can be available.

The addition of a parallel resistor such as digital potentiometer 218 isolated by transformer 216 effectively makes the overall resistance between the first pin and second pin a combination of the two resistances. The overall resistance can be represented as:

$$R_{total} = \frac{R_B \cdot R_{DP}}{(R_B + R_{DP})}$$

Figure 3:
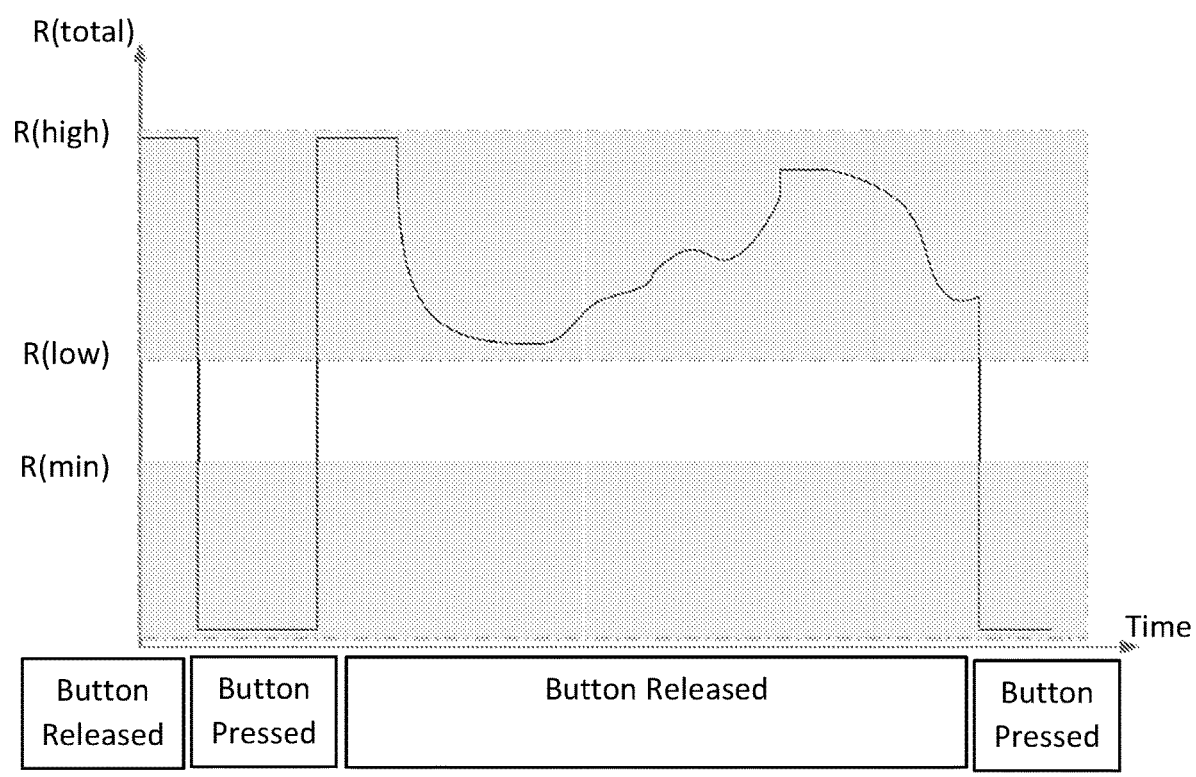
FIG. 3 is a diagram of resistance over time of an electrosurgical device circuit according to an embodiment.

In this arrangement when a button is pressed $R_{total}$ is effectively 0, making button press detection virtually equivalent to an electrosurgical device without the additional circuit. However, when the button is released, $R_{total}$ is equal to $R_{DP}$. If $R_{DP}$ adjusted to less than $R_{min}$, the generator will activate the handpiece without pressing the button. Therefore, anything less than $R_{min}$ should be avoided for the digital potentiometer to prevent unintentional activation of the electrosurgical device. Practically, a margin should be added to $R_{min}$ to ensure user safety. Accordingly, $R_{low}$ can be equal to the sum of $R_{min}$ and $R_{margin}$ while $R_{high}$ is the max resistance that can be adjusted by the digital potentiometer. As a result a diagram of $R_{total}$ over time can be configured as depicted in FIG. 3.

When the button is released, the generator will be able to detect the values between $R_{low}$ and $R_{high}$ and if the value of the $R_{DP}$ is coded by controller 220 with a digital message, the generator will be able to receive a message.

Figure 4:
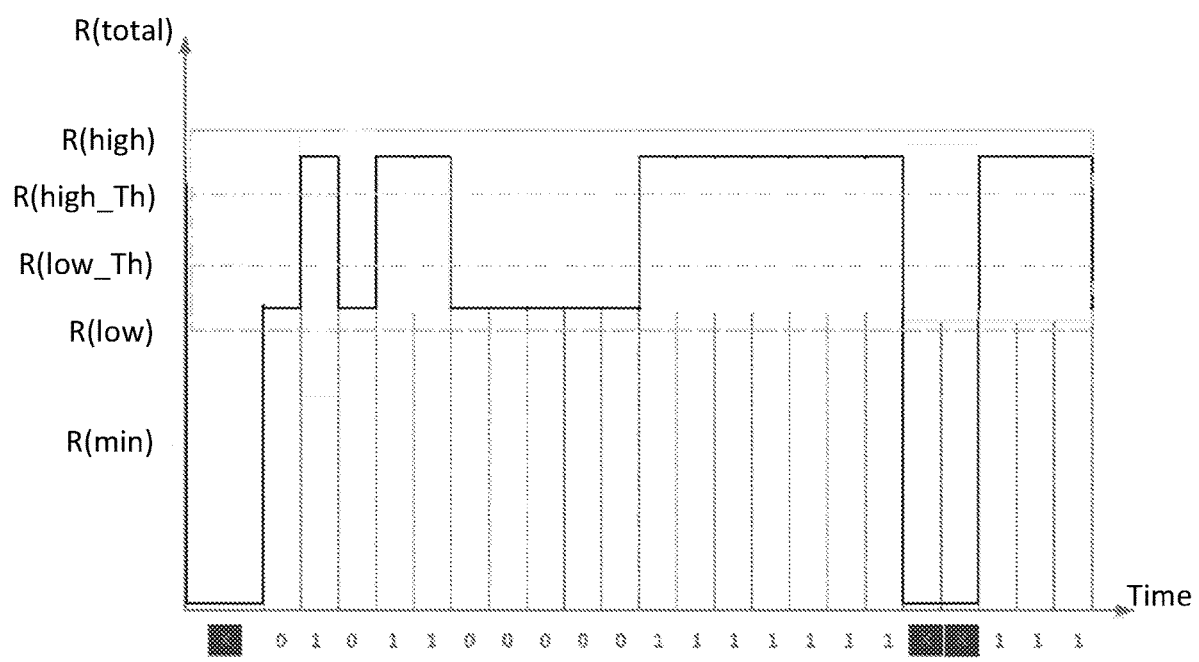
FIG. 4 is a diagram of resistance over time of an electrosurgical device circuit represented as binary values according to an embodiment.

Referring to FIG. 4, a diagram depicts the changes in the resistance over time of a digital potentiometer, such as digital potentiometer 218 corresponding to digital data. In embodiments, when a button of the electrosurgical device is pressed, the generator resistance reading is undefined from the communication aspect and the resistance will only be considered as button detection.

Although the rise and fall of resistance theoretically happens immediately as shown in FIG. 4, practically the value of the digital potentiometer cannot change immediately and a rise and fall time must be accounted for. In embodiments, a third of the resistance range ($R_{low}$-$R_{high}$) from the highest resistance will be considered as digital high threshold, $R_{High\_Th}$, and a third of the resistance range from the bottom is considered the digital low threshold, $R_{Low\_Th}$. The value between $R_{High\_Th}$ and $R_{High\_Low}$ can be considered undefined. In embodiments, up to half of the resistance range can be used as digital thresholds for interpreting communications. However, it is generally preferable to have some resistance range be undefined to better distinguish between digital data. In an embodiment, $R_{High\_Th}$ can be a fourth of the resistance range lower than $R_{High}$ while $R_{Low\_Th}$ can be a fourth of the resistance range higher than $R_{Low}$.

To prevent the occurrence of an undefined state, the communication protocol can allow enough time for resistance levels to vary between a high level and a low level. The stack code of the communication protocol can consider multiple readings within a time period to assure the level is stable. In embodiments the time period can be defined as 10 times higher than rise and fall time (whichever is higher) and will depend on the component used for the digital potentiometer.

Over time the controller within the electrosurgical device can change resistance of the digital potentiometer in a pattern to communicate device data. In embodiments, the communicated device data can include a pattern representing device ID and then accumulated use time. The range of reading must take into account the unauthorized zone to prevent unintentional activation. If $R_{DP}$ is adjusted to less than $R_{min}$, the generator will activate the handpiece without pressing the button. Therefore anything less than $R_{min}$ is an unauthorized zone for the digital potentiometer.

The resistance level communication protocol of the present disclosure accordingly allows for a peer-to-peer single sided communication hardware protocol by translating the resistance of the button press signal to digital data without affecting the main functionality of the wires being used. Notably, the definition of resistance level communication protocol is not only limited to using the different resistance changes when the main functionality is considering the resistance open. This method is only one way of using this protocol by the hardware parallel digital potentiometer topology. For example, in embodiments different resistance changes can be used when the main functionality is considering the resistance closed. Additionally alternate actuation controls such as a slider, switch, or other input mechanisms can be used in place of a button to open and close the circuit.

Embodiments of the present disclosure therefore provide for a resistance level communication protocol to enable communication between an electrosurgical handpiece and an electrosurgical generator. As a result of this communication, the electrosurgical generator can receive data from the electrosurgical handpiece in order to recognize the type of device connected to the bipolar port and other device information. This device recognition can allow the electrosurgical generator to prevent operation if the electrosurgical device is not recognized, improving safety by restricting use to known equipment and operating parameters.

The resistance level communication protocol can effectively be accomplished without changes to the hardware of the electrosurgical generators and with only minimal changes to the handpiece. The hardware changes to the electrosurgical handpiece introduce no new wiring coming from electrosurgical device 200 so as to not be cumbersome in operation and storage. Further, because no hardware changes are necessary to the electrosurgical generator, the resistance level communication protocol can be extended to preexisting electrosurgical generators via a software update.

Figure 5:
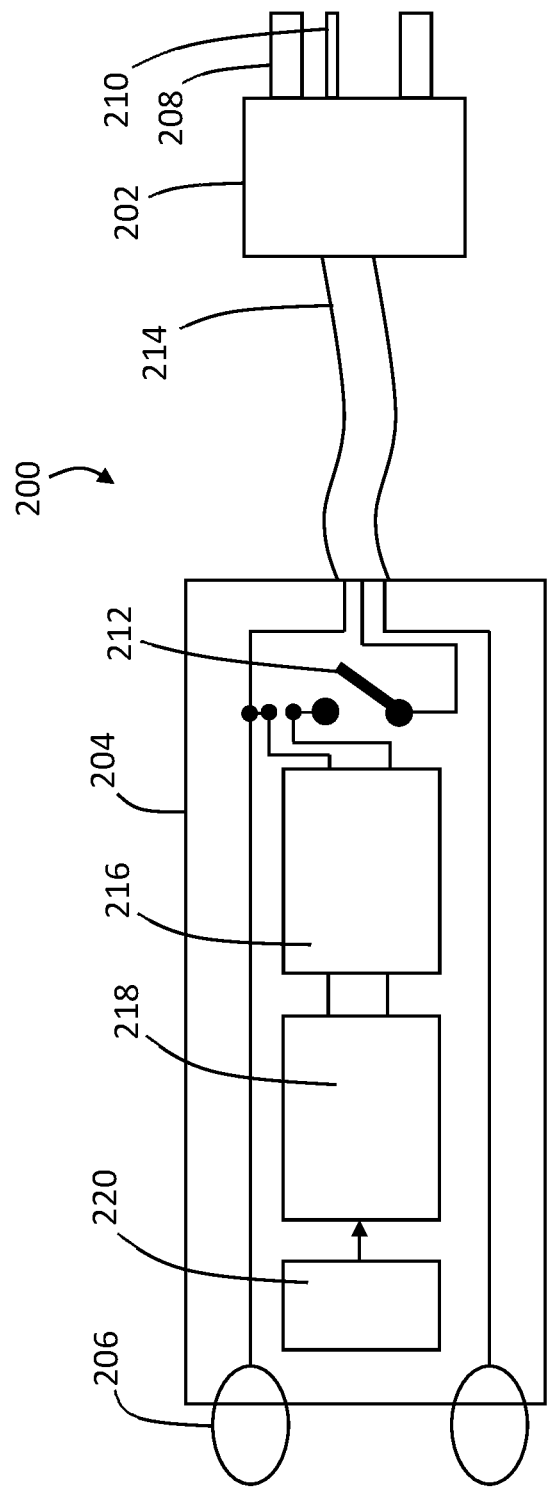
FIG. 5 is a schematic view depicting an electrosurgical device according to an embodiment.
Figure 6:
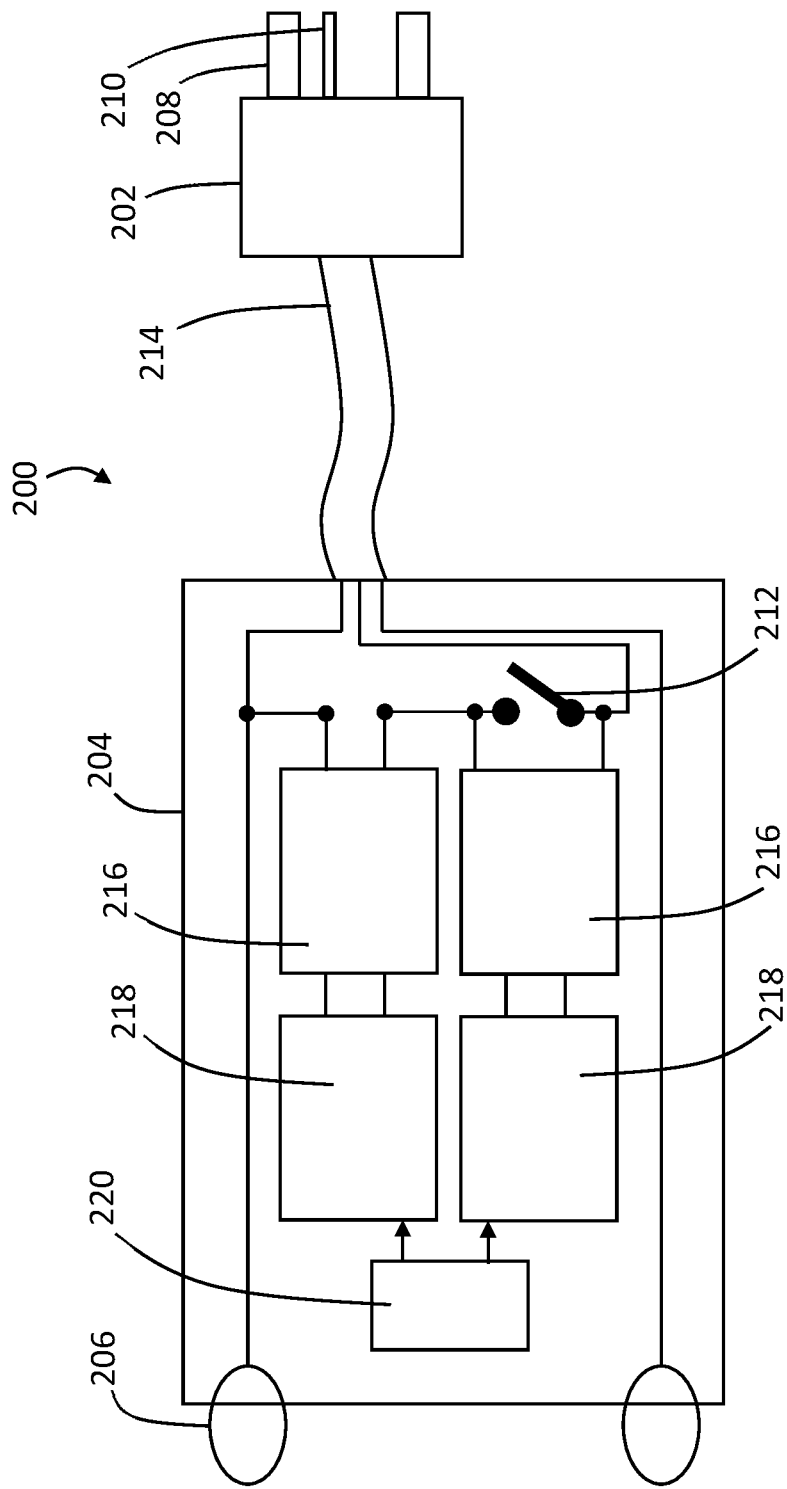
FIG. 6 is a schematic view depicting an electrosurgical device according to an embodiment.

Alternate arrangements of electrosurgical device 200 are depicted in FIGS. 5 and 6. These arrangements introduce a digital potentiometer in series with the main line and main functionality device and utilize the lower side of the resistance. These arrangements can be used if the majority of the time, the main application represents a short circuit. For electrosurgical handpieces or devices where the button is pressed for the majority of the time, it can be more reasonable to use the range of pressed button for the ADC inside the generator to detect the communication as this will enable longer periods for device data be communicated. Placing the digital potentiometer in series, as shown in FIG. 5, can make such communication possible. FIG. 6 depicts a hybrid mode of resistance communication level protocol by having two digital potentiometers with one controller to take advantage of communication when the button is pressed and released.

In embodiments, controller 220 can be powered from button signal impedance measured by measuring current rather than resistance. Such embodiments can allow for increased power of microcontroller recording and a single resistor by controller 220 such that no isolation transformer is needed. The frequency range that can be used to communicate device data is comparatively limited if no other components are included with the controller in the circuit. This reduction in range is due to added resistance by the controller. In such embodiments the reduced frequency range is sufficient to be operable with the resistance level communication protocol described by the present disclosure.

One drawback of single sided communication is that the communication signal can be replicated by a different circuit, introducing security concerns. To address this concern, encryption can be implemented from the electrosurgical handpiece to the generator but that first requires a handshake (two way communication). The inventors of the present disclosure have discovered a means of creating a communication, that can be used as handshake for resistance level communication protocol, from the generator to the electrosurgical device.

Figure 7:
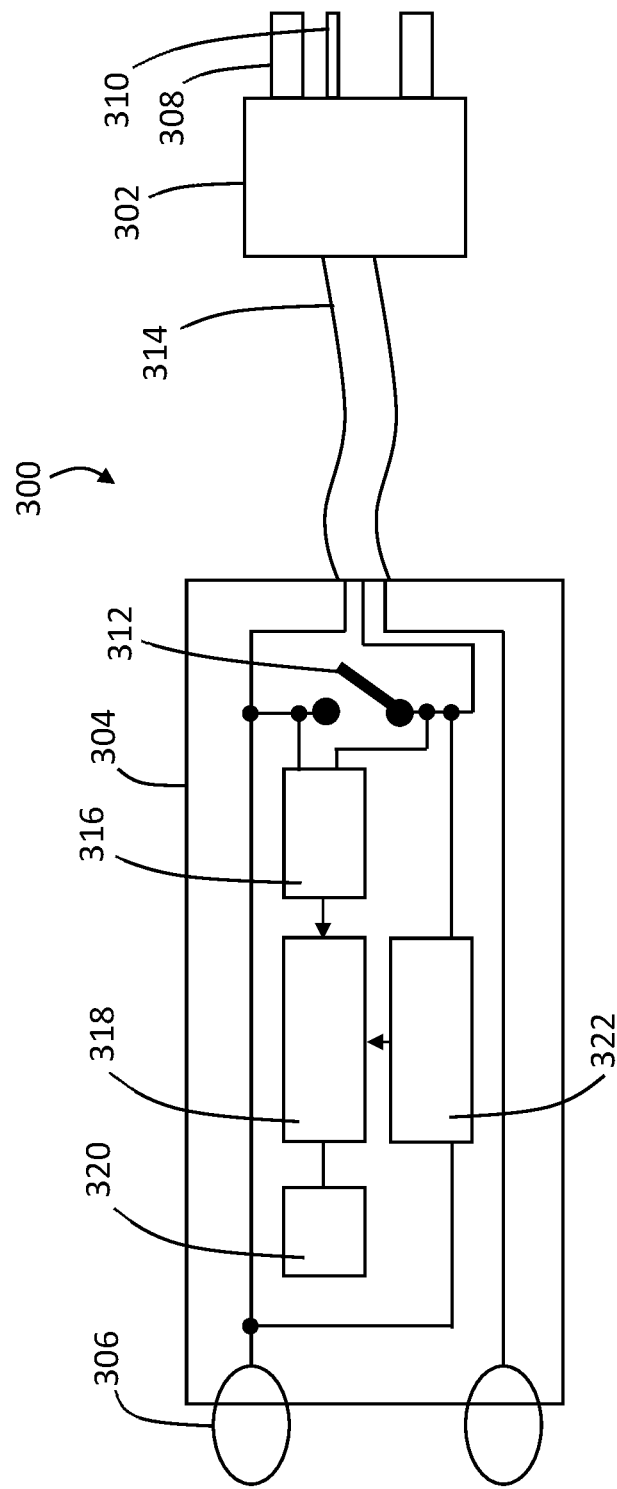
FIG. 7 is a schematic view depicting an electrosurgical device according to an embodiment.

FIG. 7 depicts a schematic diagram of an electrosurgical device 300 configured to facilitate two-way communication with an electrosurgical generator. Electrosurgical device 300 includes connector 302 and bipolar handpiece 304 having two electrodes 306, switch 312, cord 314, AC-DC converter 316, processor 318, and resistor 320. Connector 302 includes large pins 308 and small pin 310 and is configured to be compatible with existing electrosurgical power source or bipolar energy supplies.

As previously described, the generator uses a signal to detect when the button is pressed and this is the same signal that is used for resistance level communication protocol DC power (extracted energy) and for resistance measurement. Both the generator and the electrosurgical device 300 do not rely on the frequency of the button signal, meaning that small changes in frequency to the button detect signal would not alter the functionality of the button detect, the resistance level communication protocol power supply, and the resistance level communication protocol. For example, if the generator typically uses a 47 KHz signal to detect the button press that frequency can be changed to 40 KHz instead of 47 KHz without interrupting operation. The circuit should be checked for the cutoff frequency to determine the range at which the button detect frequency can be manipulated without effecting operation.

The button press detection frequency is generated inside the generator from a complex programming logic device (CPLD) or field-programmable gate array (FPGA). A processor is in continuous communication with CPLD and can notify the CPLD to use a different frequency than the standard operating frequency. Implementation of a variance in button press detection frequency can accordingly be changed through a software update, making two-way communication possible using preexisting generators.

The technique of sending digital data by changing frequency is called Frequency Shift Keying (FSK). The FSK receiver can be a simple counter that can measure the frequency and convert that into data. The counter can be as simple as one pin of processor 318 with shaping (clipping) circuit 322 to convert the sine wave to square wave. With this method, two-way communication can be stablished.

Highs and Lows on resistor 320 change the current on the power consumption of processor 318 which comes from AC-DC converter 316. The result is those Highs and Lows can be translated into current being sensed in the generator to implement resistance level communication protocol.

Figure 8:
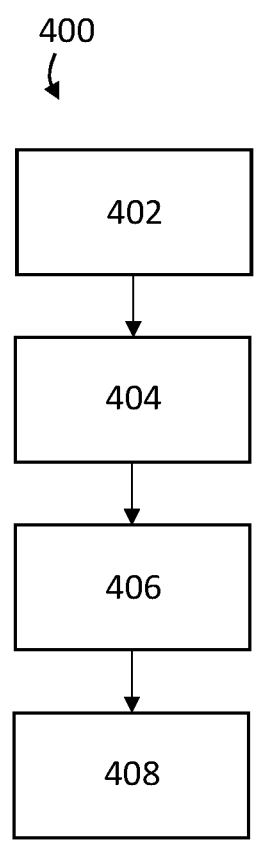
FIG. 8 is a flowchart of a method for interactive encryption according to an embodiment.

An interactive encryption in the acknowledgement message from the generator can be implemented with electrosurgical device 300. FIG. 8 depicts a flowchart of a method 400 for such interactive encryption according to an embodiment. Method 400 applies a function to a device ID of the electrosurgical device to create encrypted data. Because the encryption method and encryption output are dependent on the device ID and will therefore be varied.

At 402, a first portion (e.g. the first 8 bits) of the device ID is read. In embodiments, different device-specific static data may be used in place of a device ID.

At 404, the first portion of the device ID can be used to define what encryption algorithm will be used.

At 406, the selected encryption algorithm is applied to the device ID.

At 408, the output of the selected encryption algorithm from 406 is cut to fit in a reduced number of Bytes. In embodiments, the output is cut to fit in 2 Bytes. This size reduction introduces the possibility that from the encrypted data, the plain data would not be unique. Since the goal for this encryption is to acknowledge a known plain data, it is beneficial to make it nonrecoverable.

Method 400 can output plain data that is known by both the electrosurgical device and the generator. This simplifies the handshake to a simple comparison of the output from each device. Method 400 therefore provides for double encrypted data that is interactively tied to the plain data as the method of encryption is itself also encrypted.

Figure 9:
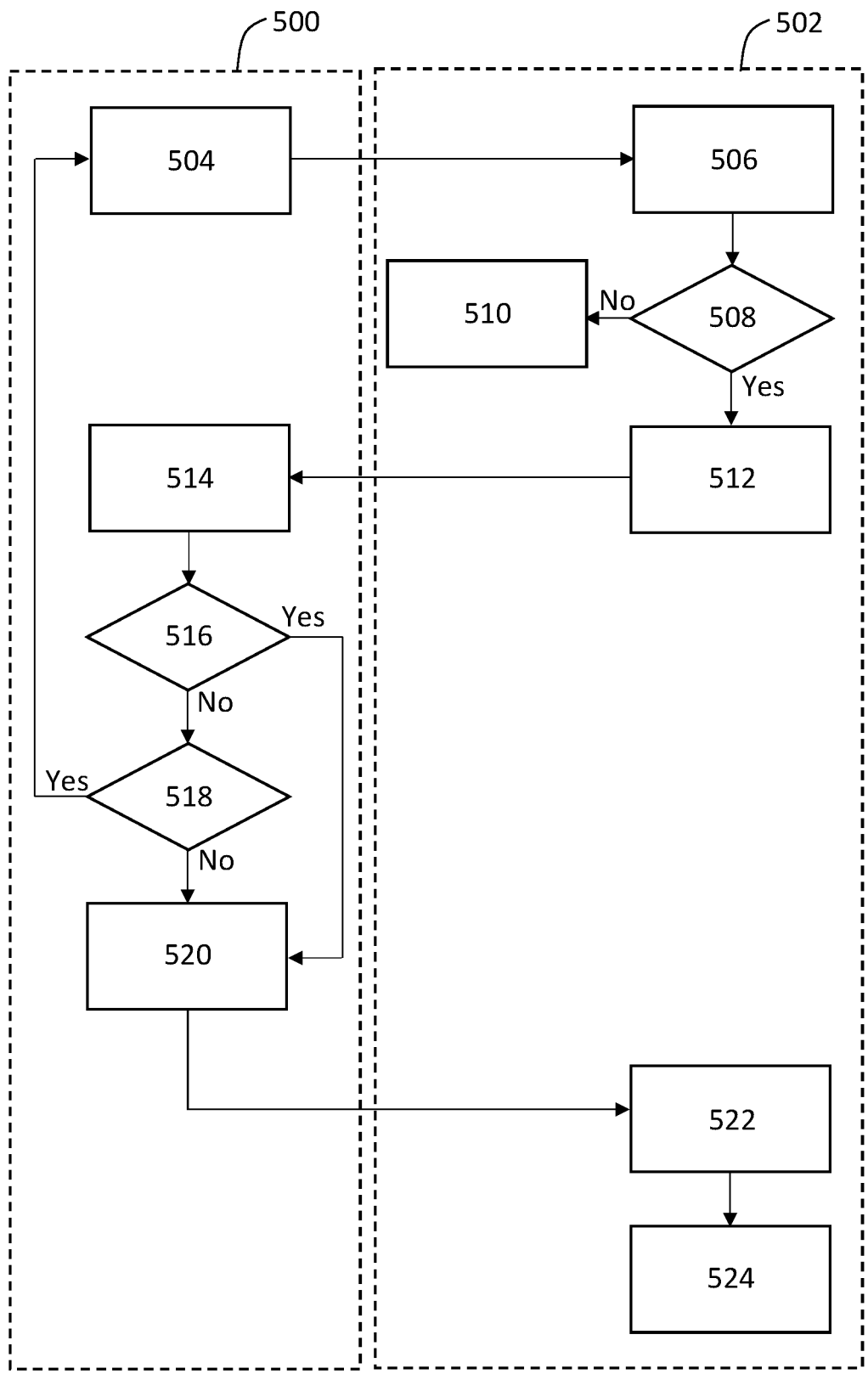
FIG. 9 is a flowchart of a method for two-way communication between an electrosurgical device and a generator, according to an embodiment.

Referring to FIG. 9, a flowchart of electrosurgical device operations 500 and generator operations 502 to implement method 400 are depicted according to an embodiment.

At 504 the electrosurgical device sends the device ID to the generator using the resistance level communication protocol.

At 506 the generator receives the device ID over the resistance level communication protocol.

At 508 the generator determines if the device ID is correct.

If the device ID is not correct, at 510 an error is displayed or otherwise reported to a user.

If the device ID is correct, at 512 an encrypted response and real-time communication (RTC) are sent by the generator to the electrosurgical device using FSK. Sending this information serves as an acknowledgement of the device ID.

At 514 the electrosurgical device receives the acknowledgement.

At 516 the electrosurgical device determines whether the electrosurgical device is expired.

If the electrosurgical device is not expired, at 518 the electrosurgical device determines whether the acknowledgement is correct. If the acknowledgement is correct, the electrosurgical device returns to 504 and continues to report device data.

If the electrosurgical device is expired, at 520 the electrosurgical device intentionally sends an incorrect device ID to the generator using the resistance level communication protocol.

At 522 the generator receives the incorrect device ID over the resistance level communication protocol.

At 524 an error is displayed or otherwise reported to a user. In embodiments the incorrect device ID can be a particular code configured to result in a unique error such that a user may be made aware the electrosurgical device is expired.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A system configured to establish two-way communication using a resistance level communication protocol, the system comprising:
    a generator; and
    an electrosurgical device comprising:
        an electrical connector configured to receive a treatment signal and a continuous signal from the generator;
        an AC-DC converter configured to convert the continuous signal to a DC signal;
        a processor configured to receive the DC signal; and
        a resistor connected to the processor and configured to vary a current of power used by the processor over time;
    wherein the generator is configured to interpret variances in the current as data and provide an acknowledgement to the electrosurgical device using frequency shift keying (FSK).

2. The system of claim 1, wherein the data is one or more of a device ID, an accumulated use time for the device, manufacturing information, and waveform information.

3. The system of claim 1, wherein the acknowledgment is based on the data.

4. The system of claim 3, wherein the acknowledgement comprises output of an encryption algorithm applied to the data.

5. The system of claim 4, wherein the encryption algorithm is selected based on at least a portion of the data.

6. The system of claim 1, wherein the acknowledgment is a set number of bytes.

7. The system of claim 1, wherein the data is based on multiple readings of the current within a time period.

8. The system of claim 1, wherein the generator is further configured to limit a frequency of the treatment signal based on the data.

9. The system of claim 1, wherein the generator is further configured to provide an alert that the electrosurgical device has expired based on the data.

10. A method of two-way communication between an electrosurgical device and a generator comprising:
providing, via the generator, a continuous signal to the electrosurgical device and at the electrosurgical device:
converting the continuous signal to a DC signal;
powering a processor with the DC signal; and
varying, using a resistor, a current of power used by the processor over time;
providing, via the electrosurgical device, the current to the generator and at the generator:
interpreting variances in the current as data; and
sending an acknowledgement to the electrosurgical device using frequency shift keying (FSK).

11. The method of claim 10, wherein the data is one or more of a device ID, an accumulated use time for the device, manufacturing information, and waveform information.

12. The method of claim 10, wherein the acknowledgment is based on the data.

13. The method of claim 12, wherein the acknowledgement comprises output of an encryption algorithm applied to the data.

14. The method of claim 13, wherein the encryption algorithm is selected based on at least a portion of the data.

15. The method of claim 10, wherein the acknowledgment is a set number of Bytes.

16. The method of claim 10, wherein the data is based on multiple readings of the current within a time period.

17. The method of claim 10, wherein the generator is further configured to limit a frequency of a treatment signal provided to the electrosurgical device based on the data.

18. The method of claim 10, further comprising the generator providing an alert that the electrosurgical device has expired based on the data.

19. A system configured to establish two-way communication using a resistance level communication protocol, the system comprising:
a generator; and
an electrosurgical device comprising:
an electrical connector configured to receive a treatment signal and a continuous signal from the generator;
a transformer configured to isolate the continuous signal;
a digital potentiometer configured to receive the isolated continuous signal; and
a controller configured to vary the resistance of the digital potentiometer over time;
wherein the generator is configured to interpret the variation in the resistance as data and provide an acknowledgement to the electrosurgical device using frequency shift keying (FSK).

20. The system of claim 19, wherein the data is one or more of a device ID, an accumulated use time for the device, manufacturing information, and waveform information.

* * * * *